United States Patent
Murthy et al.

(10) Patent No.: US 8,630,057 B2
(45) Date of Patent: Jan. 14, 2014

(54) IN-SITU CONTACT POTENTIAL MEASUREMENT IN HARD-DISK DRIVES

(75) Inventors: Aravind N. Murthy, San Jose, CA (US); Remmelt Pit, Menlo Park, CA (US); Karl Arthur Flechsig, Los Gatos, CA (US)

(73) Assignee: HGST Netherlands B.V., Amsterdam (NL)

( * ) Notice: Subject to any disclaimer, the term of this patent is extended or adjusted under 35 U.S.C. 154(b) by 35 days.

(21) Appl. No.: 13/495,513

(22) Filed: Jun. 13, 2012

(65) Prior Publication Data

US 2013/0335852 A1 Dec. 19, 2013

(51) Int. Cl.
*G11B 21/02* (2006.01)
*G11B 27/36* (2006.01)

(52) U.S. Cl.
USPC ................................. 360/75; 360/31

(58) Field of Classification Search
None
See application file for complete search history.

(56) References Cited

U.S. PATENT DOCUMENTS

| | | | |
|---|---|---|---|
| 6,999,265 B1 * | 2/2006 | Schreck et al. | 360/75 |
| 7,046,473 B2 * | 5/2006 | Fu et al. | 360/75 |
| 7,321,476 B2 | 1/2008 | Baumgart et al. | |
| 7,830,634 B2 | 11/2010 | Chen et al. | |
| 2010/0142096 A1 | 6/2010 | Contreras et al. | |
| 2011/0149428 A1 | 6/2011 | Franca-Neto et al. | |
| 2011/0157736 A1 | 6/2011 | Contreras et al. | |
| 2011/0157739 A1 | 6/2011 | Knigge et al. | |

OTHER PUBLICATIONS

Yansheng MA et al., Experimental Study of Slider-Disk Interaction Process with Thermal-Flying-Height Controlled Slider, published online Jan. 11, 2011, printed from http://www.springerlink.com/content/c51u451202143711/fulltext.pdf.

Uwe Boettcher et al., Servo Signal Processing for Fly Height Control in Hard Disk Drives, published online Jan. 7, 2011, printed from http://maeresearch.ucsd.edu/callafon/publications/2011/MST1.pdf.

* cited by examiner

*Primary Examiner* — Andrew L Sniezek

(74) *Attorney, Agent, or Firm* — Christopher J. Brokaw; Brokaw Patent Law PC (57) ABSTRACT

Approaches are provided for a hard-disk drive (HDD) and a method for measuring the contact potential between head and disk interfaces within a hard-disk drive. In one example, a voltage bias is applied to a head slider at discrete increments, and the touchdown power is determined at each increment. The voltage bias at which the TDP maximizes equals the inverse polarity of the inherent contact potential between the head slider and disk, and this value may be used to apply a voltage that neutralizes the contact potential.

20 Claims, 6 Drawing Sheets

IN-SITU CONTACT POTENTIAL MEASUREMENT IN HARD-DISK DRIVES

FIELD OF THE INVENTION

This application relates generally to hard disk drives and, more specifically, to systems and methods for measuring the contact potential between head and disk interfaces within a hard-disk drive (HDD).

BACKGROUND OF THE INVENTION

A hard-disk drive (HDD) is a non-volatile storage device that is housed in a protective enclosure and stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head (hereinafter "head") which is positioned over a specific location of a disk by an actuator.

A head uses a magnetic field to read data from and write data to the surface of a magnetic-recording disk. As a magnetic dipole field decreases rapidly with distance from a magnetic pole, the distance between a head and the surface of a magnetic-recording disk must be tightly controlled. An actuator relies on suspension's force on the head to provide the proper distance between the head and the surface of the magnetic-recording disk while the magnetic-recording disk rotates. A head therefore is said to "fly" over the surface of the magnetic-recording disk.

It is important to maintain the optimal distance between the head and the disk while performing read/write operations. If the head flies too low, then the head could wear, pick up lubricant or other debris, or make physical contact with the disk. Inadvertent contact between the head and the disk during a read/write operation can result in read/write errors or damage to either the head or the disk. Too high a fly height may also result in read/write errors and may frustrate efforts to achieve a consistent fly height. Any electrical potential difference between the head and the disk may also affect the optimal fly height; therefore, it is advantageous to determine this inherent electrical potential as part of an approach for maintaining a particular fly height.

SUMMARY OF THE INVENTION

Approaches described herein teach devices and methods for measuring the contact potential between head and disk interfaces within a hard-disk drive.

In an embodiment, a hard disk drive comprising a head attached to a slider, a disk rotatably mounted on a spindle, a drive motor having a motor shaft attached to the spindle for rotating the disk, a voice-coil motor configured to move the head to access portions of the disk, and one or more electronic components. The electronic components are configured to apply a range of electric current to the slider in discrete increments, and for each increment, measure the amount of electric current supplied to the thermal fly height control (TFC) that results in contact between the head and the disk. The electronic components then determine the increment of electric current delivered to the slider at which the amount of electric current supplied to a TFC that results in contact between the head and the disk is maximized and based on this determination, calculate the contact potential.

In an embodiment, a hard disk drive comprising a head attached to a slider, a disk rotatably mounted on a spindle, a drive motor having a motor shaft attached to the spindle for rotating the disk, a voice-coil motor configured to move the head to access portions of the disk, and one or more electronic components. The electronic components are configured to apply a range of electric current to the slider in discrete increments, where the slider is communicatively coupled to a TFC. The TFC is actuated while applying the range of electric current, and the touchdown power (TDP) is measured at each increment of the electric current, and the increment of the electric current at which the TDP is highest is identified and applied on a continuous basis to the slider during operation of the drive.

In an embodiment, a method is provided where a range of electric current is applied to a slider in a hard-disk drive in discrete increments. At each increment, the amount of electric current supplied to a thermal fly height control (TFC) that results in contact between a head and a disk of the hard-disk drive is measured, wherein the slider and the head are coupled. Then, a determination is made of the increment of electric current delivered to the slider at which the amount of electric current supplied to the TFC that results in contact between the head and the disk is maximized, and a calculation is made of a contact potential between the slider and the disk based on this determination.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Some embodiments are illustrated by way of example and not limitation in the figures of the accompanying drawings in which like reference numerals refer to similar elements and in which.

DETAILED DESCRIPTION OF THE INVENTION

Approaches for determining, while a hard-disk drive (HDD) is in operation, a contact potential existing between a head and disk interface in the HDD are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Figure 1:
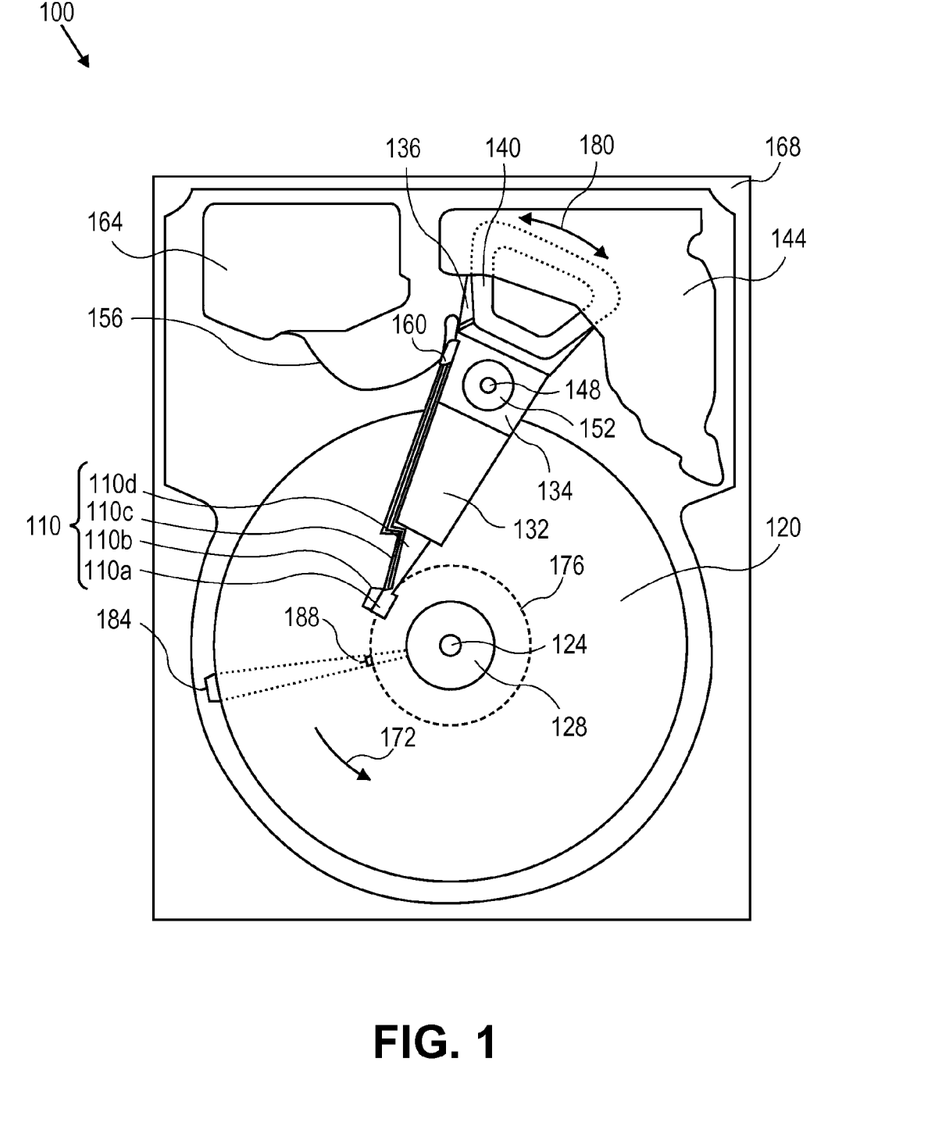
FIG. 1 is a plan view of an HDD according to an example implementation.

Embodiments of the invention may be used to determine the contact potential between interfaces of a disk drive. Embodiments of the invention may be incorporated with a hard-disk drive (HDD). In accordance with an embodiment of the invention, a plan view of a HDD 100 is shown in FIG. 1. FIG. 1 illustrates the functional arrangement of components of the HDD including a slider 110*b* that includes a magnetic-reading/recording head 110*a*. Collectively, slider 110B and head 110*a* may be referred to as a head slider. The HDD 100 includes at least one head gimbal assembly (HGA) 110 including the head 110*a*, a lead suspension 110*c* attached to the head 110*a*, and a load beam 110*d* attached to the slider 110*b*, which includes the head 110*a* at a distal end of the slider 110*b*; the slider 110*b* is attached at the distal end of the load beam 110*d* to a gimbal portion of the load beam 110*d*. The HDD 100 also includes at least one magnetic-recording disk 120 rotatably mounted on a spindle 124 and a drive motor (not shown) attached to the spindle 124 for rotating the disk 120. The head 110*a* includes a write element and a read element for respectively writing and reading information stored on the disk 120 of the HDD 100. The disk 120 or a plurality (not shown) of disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown); the armature 136 of the VCM is attached to the carriage 134 and is configured to move the arm 132 and the HGA 110 to access portions of the disk 120 being mounted on a pivot-shaft 148 with an interposed pivot-bearing assembly 152.

With further reference to FIG. 1, in accordance with an embodiment of the present invention, electrical signals, for example, current to the voice coil 140 of the VCM, write signal to and read signal from the PMR head 110*a*, are provided by a flexible cable 156. Interconnection between the flexible cable 156 and the head 110*a* may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110*a* of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110*b* rides so that the slider 110*b* flies above the surface of the disk 120 without making contact with a thin magnetic-recording medium of the disk 120 in which information is recorded. The electrical signal provided to the voice coil 140 of the VCM enables the head 110*a* of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of concentric tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110*a* of the HGA 110 reads the servo-burst-signal pattern which provides a position-error-signal (PES) to the servo electronics, which controls the electrical signal provided to the voice coil 140 of the VCM, enabling the head 110*a* to follow the track 176. Upon finding the track 176 and identifying a particular sectored track portion 188, the head 110*a* either reads data from the track 176 or writes data to the track 176 depending on instructions received by the disk controller from an external agent, for example, a microprocessor of a computer system.

Embodiments of the invention also encompass HDD 100 that includes the HGA 110, the disk 120 rotatably mounted on the spindle 124, the arm 132 attached to the HGA 110 including the slider 110*b* including the head 110*a*.

Figure 2:
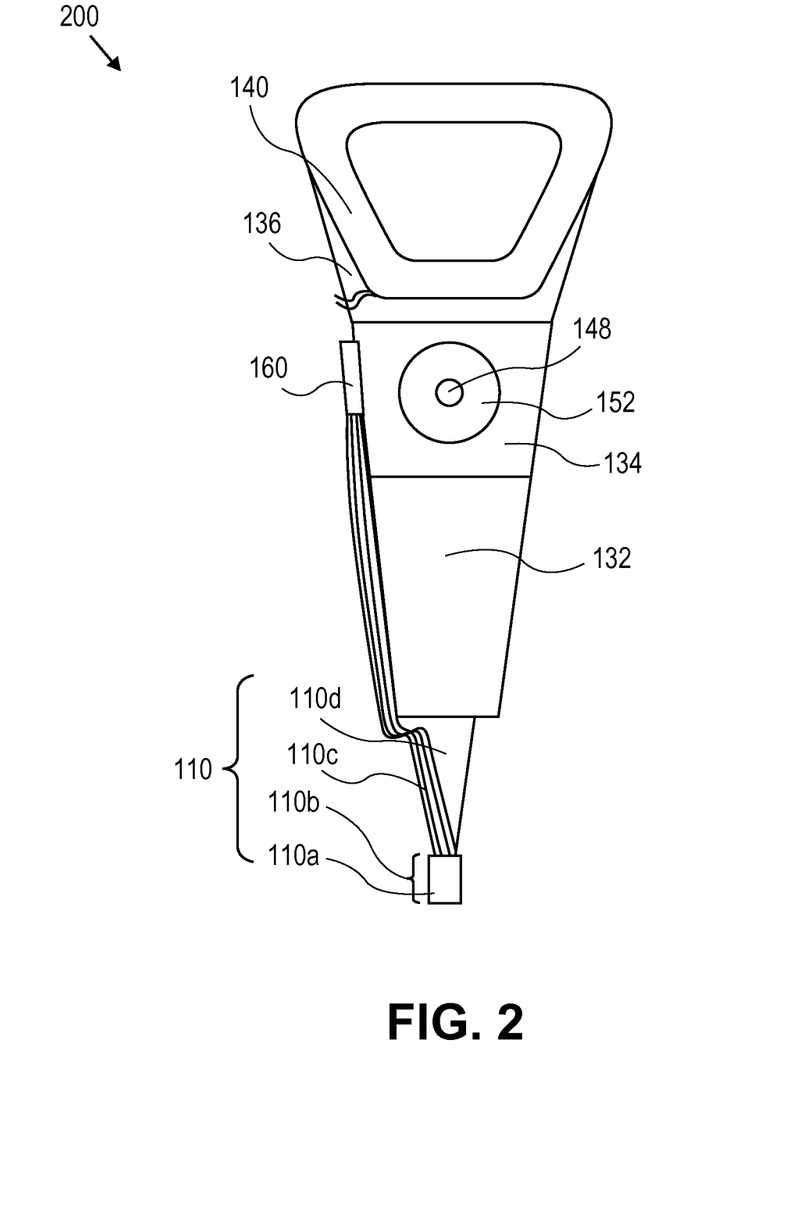
FIG. 2 is a plan view of a head-arm-assembly (HAA) according to an example implementation.

With reference now to FIG. 2, in accordance with an embodiment of the present invention, a plan view of a head-arm-assembly (HAA) including the HGA 110 is shown. FIG. 2 illustrates the functional arrangement of the HAA with respect to the HGA 110. The HAA includes the arm 132 and HGA 110 including the slider 110*b* including the head 110*a*. The HAA is attached at the arm 132 to the carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 2, the armature 136 of the VCM is attached to the carriage 134 and the voice coil 140 is attached to the armature 136. The AE 160 may be attached to the carriage 134 as shown. The carriage 134 is mounted on the pivot-shaft 148 with the interposed pivot-bearing assembly 152.

Figure 3:
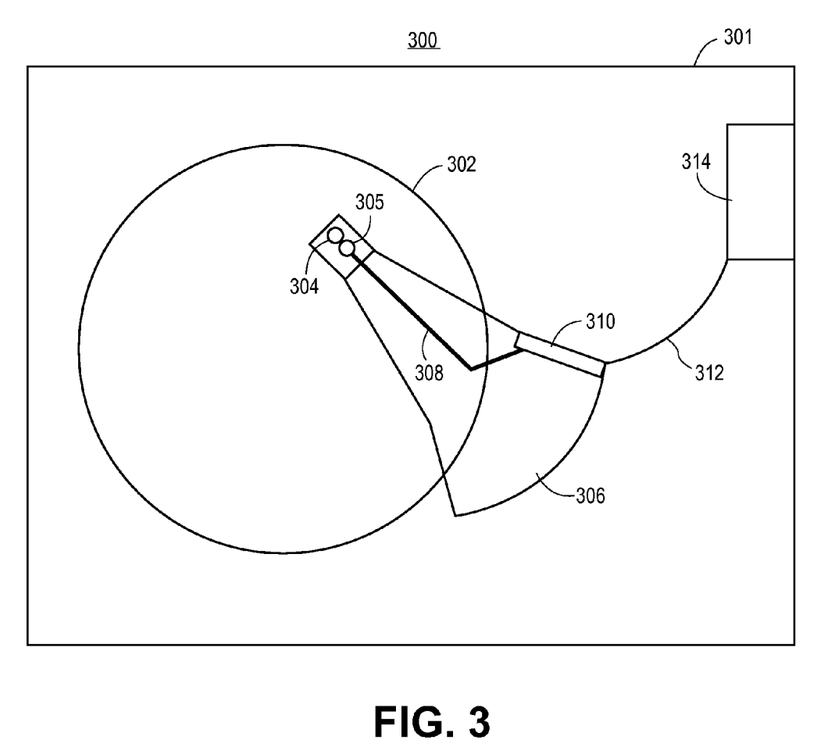
FIG. 3 is an illustration of a read/write circuit within an HDD according to an example implementation.

FIG. 3 is an illustration of a read/write circuit 310 within an HDD according to an embodiment of the invention. FIG. 3 depicts hard-disk drive (HDD) 300 which includes enclosure 301 that contains one or more magnetic platters or disks 302, read elements 304, write elements 305, an actuator arm suspension 306, a transmission line interconnect 308, a read/write integrated circuit (IC) 310, a flexible interconnect cable 312, and a disk enclosure connector 314.

Electrical signals are communicated between the read/write elements and read/write integrated circuit 310 over transmission line interconnect 308. Read/write integrated circuit 310 conditions the electrical signals so that they can drive write element 305 during writing and amplifies the electrical signal from read element 304 during reading. Signals are communicated between read/write integrated circuit 310 and disk enclosure connector 314 over flexible cable 312. Disk enclosure connector 314 conducts signals with circuitry external to disk enclosure 301. In other embodiments, read/write integrated circuit (IC) 310 is located elsewhere than depicted in FIG. 3, such as on flex cable 312 or on printed circuit board (PCB) within the hard-disk drive.

Functional Overview

Example approaches are presented for determining an inherent contact potential existing between a head slider and disk of a HDD. In one implementation, a voltage bias is applied to a head slider at discrete increments, and the touchdown power ("TDP") is determined at each increment, as discussed herein. The voltage bias at which the TDP maximizes equals the inverse polarity of the inherent contact potential between the head slider and disk, and the contact potential may be determined by inference from this value.

Contact Potential Determination Via Thermal Fly Height Control

Figure 4:
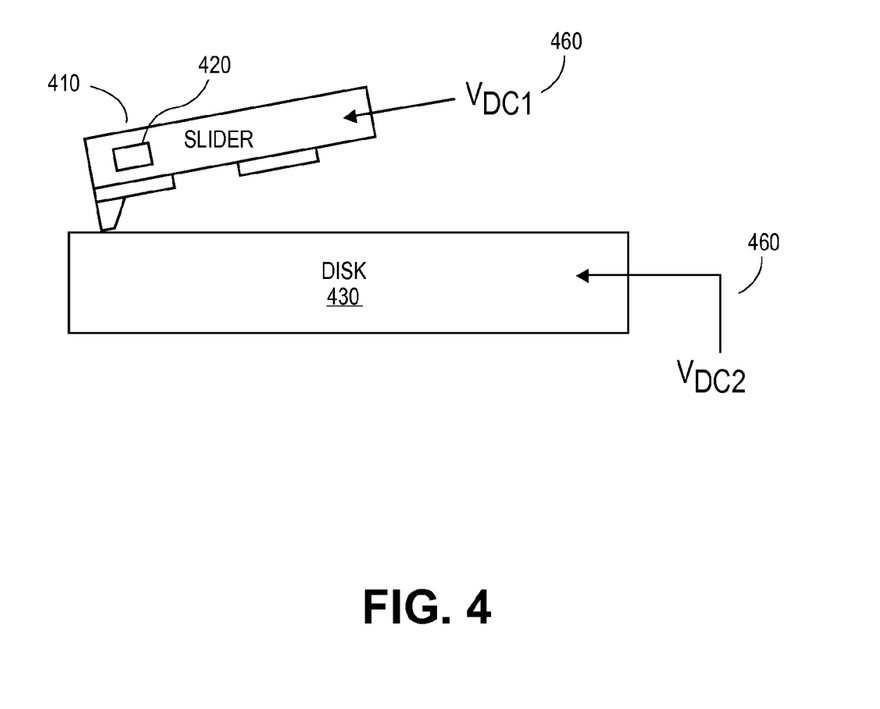
FIG. 4 is an illustration of a head slider and a disk according to an example implementation.

FIG. 4 is an illustration of a contact potential determination architecture 400 employed by implementations of the approach described herein. In the example of FIG. 4, there is pictured a head slider 410, a thermal fly height control (TFC) 420 and a magnetic-recording disk 430. Other arrangements of the above-referenced components are possible, and additional components known in the art may be interposed and/or utilized without changing the approaches described herein.

In one implementation, voltage supplied to TFC 420 is used to control the fly height of head slider 410 relative to disk 430. Fly height may be described as the distance at which the head slider 410 "flys" over disk 430 during operation of the drive, for example during read/write operations. In various embodiments, the fly height may be adjusted by applying voltage to a heater coil comprised within TFC 420 connected to the head slider 410. For example, by increasing or decreasing the voltage delivered to TFC 420, a portion of the head slider 410 expands or contracts, as known in the art. This expansion and contraction of head slider 410 changes how much distance is between head slider 410 and disk 430 when the head slider 410 flys over disk 430.

The power required to actuate the head slider 410 until it contacts the disk 430 is known as touchdown power ("TDP"). This is an indirect measurement of how high the head slider is flying, as the higher a head slider is from a disk, the more power it takes to actuate the head slider 410 until it contacts the disk 430; in other words, to close the gap between the interfaces. Therefore, it may be understood that TDP represents the maximum fly height for any given condition. Also, milliwatts (mw) or similar measurements may be used to express the fly height instead of measurements of distance because, as discussed, TDP (measured in mw for purposes of this application) is an indirect representation of fly height. TDP may be used to set the fly height; for example, if the TDP for a certain head slider and disk interface is "x" mw, then this provides a baseline measure against which adjustments can be made to achieve a desired fly height during read/write operations. For example, the desired fly height at which read/write operations should take place can be set to "y" mw by reducing the power supplied to TFC 420 by "z" mw from TDP (or "x"). Thus, x=y+z or TDP (x)=read/write TFC power (y)+back off TFC power (z). The TDP value may be converted to nanometers of fly height in performing the fly height setting operation in a HDD. Any HDD level indicator known in the art may be used to detect when head slider 410 makes contact with disk 430. Example contact detection indicators in HDD are based on signal changes due to either head slider bounce (e.g., readback signal amplitude modulation) or based on detecting friction due to slider to disk contact (e.g., VCM, position error signal, motorcurrent). Acoustic emission sensors and Laser Doppler Vibrometer can also be used as contact indicators.

In example implementations, TFC 420 is actuated and a DC voltage bias 460 is applied to head slider 410, or the disk 430, or both the head slider 410 and the disk 430. This can be achieved by electrically isolating the head slider 410 from the disk 430. A HDD Pre-Amp (not pictured) is capable of delivering a range of DC voltage that is within a suitable range for determining the head-disk contact potential, which in certain implementations may be a range between 0.2V to 0.5V. In some implementations, the disk may be grounded.

In one example, the DC voltage bias 460 is applied to the head slider 410 at a range of discrete values within an upper and lower bound; for example, at various values between −2 volts to +2 volts, such as at every 0.2 volt interval (e.g., −2.0 v, −1.8 v, −1.6 v and so on. This range and the values within it at which measurements are taken may vary according to various embodiments, as described herein). For clarity, this application of the DC voltage bias 460 will be referred to as a "sweep." In this example, the voltage sweep is implemented from −2 volts to +2 volts and is measured in 0.2-volt increments.

As the DC voltage bias sweep is applied to the head slider 410, the TDP required to actuate the head slider 410 and lower the fly height until the head slider 410 contacts the disk 430 is measured at various DC voltage bias 460 settings. The DC voltage bias 460 at which this TDP is maximum (gives the highest head slider 410 to disk 430 clearance) will be equal to the inverse polarity of the inherent contact potential between the head slider 410 and the disk 430 (i.e., application of this voltage neutralizes the inherent contact potential between head slider 410 and disk 430). By inference, the inherent contact potential between head slider 410 and disk 430 may be determined. This contact potential determination may then be used to set and/or control the fly height, according to various implementations and as described further herein.

Figure 5:
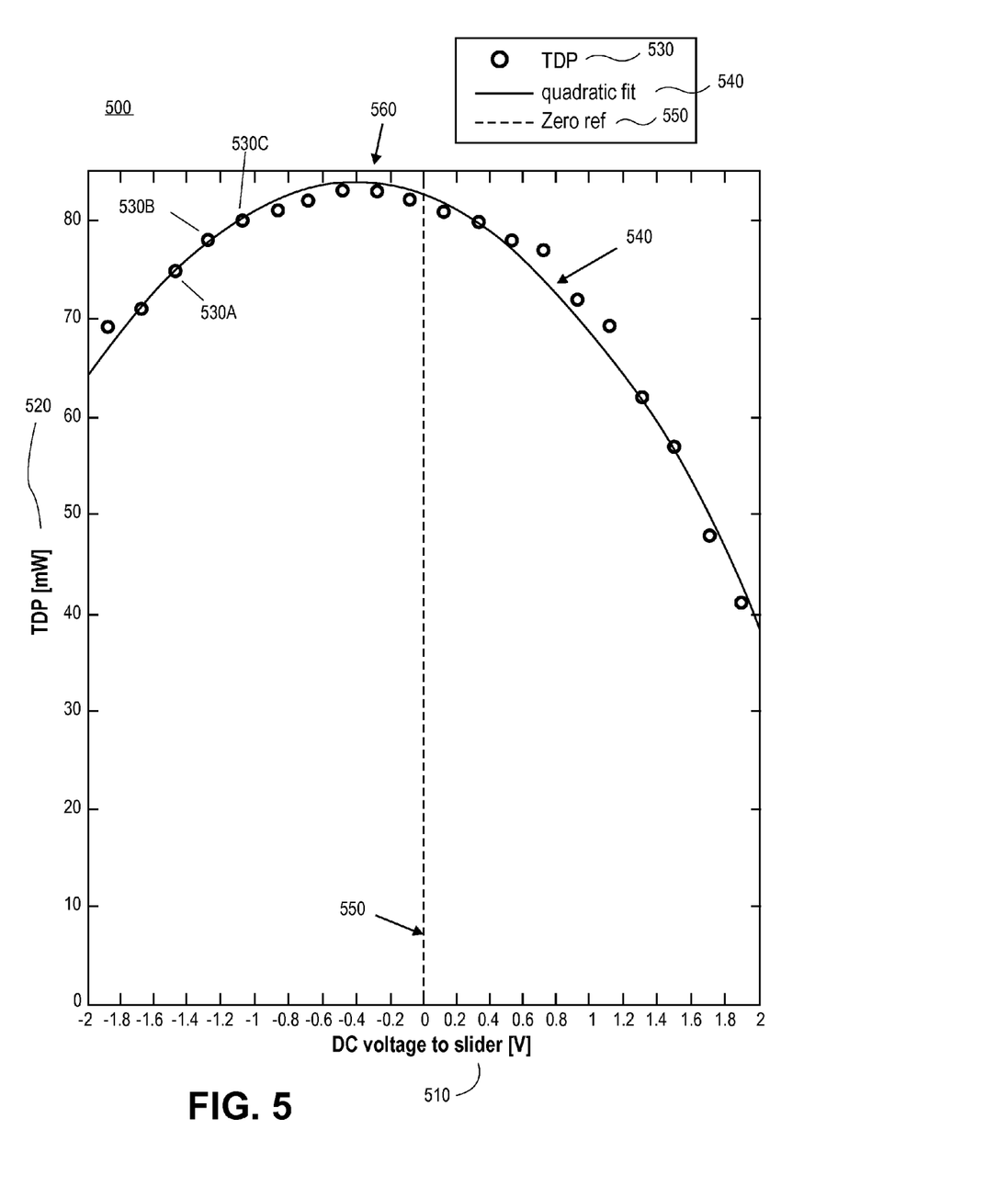
FIG. 5 is a graph illustrating an approach for determining the contact potential between a head slider and a disk where a voltage bias is applied to the head slider according to an example implementation.

FIG. 5 is a graph 500 illustrating an example implementation for determination of the inherent contact potential between a head slider and a disk where a voltage bias is applied only to the head slider. In this example, as with the example of FIG. 4, TFC 420 is actuated while a DC voltage bias sweep is applied to head slider 410. In this example implementation, a DC voltage bias 460 is applied to head slider 410 in a "sweep" from −2 volts to +2 volts. The horizontal axis 510 of the graph 500 represents in volts the DC voltage bias 460 applied to the head slider 410, in this example from −2 volts to +2 volts. While the horizontal axis 510 in FIG. 5 is divided into increments of 0.2 volts, it should be understood that this division is merely an example. According to an alternate implementation, the voltage sweep is continuous from one voltage level to another rather than pulsed at various increments.

As DC voltage bias 460 is applied to head slider 410, the TDP required to actuate head slider 410 and lower the fly height until head slider 410 contacts disk 430 is measured at different discrete voltage levels within the range of the sweep. The vertical axis 520 of the graph 500 represents the TDP in milliwatts, but as discussed herein, other units of measurement are envisioned. In the example of FIG. 5, the TDP is measured at various DC voltage bias levels 510. Sample recordings of this measurement are illustrated 530a-530c on the graph 500. Each dot (refer to the legend of FIG. 5) on the graph (e.g., 530a-530c) is the TDP at that voltage bias 510. For example, at −1.4 v applied to head slider 410, the TDP is approximately 75 mw (530a). At −1.2 v applied to head slider

410, the TDP is approximately 78 mw (530*b*). At −1.0 v applied to head slider 410, the TDP is approximately 80 mw (530*c*), and so on.

A quadratic fit curve 540 of the TDP measurements obtained according to the currently-discussed example is illustrated on graph 500. By way of explanation, quadratic fit curve 540 represents the electrostatic force of head slider 410 being attracted to disk 430, offset by the air created by the rotation of disk 430 pushing back. As the voltage bias is changed on either side of the zero x-axis 550, the TDP and hence the fly height changes due to electrostatic force between the head slider and the disk. In this example, a voltage bias of +2V decreases the TDP to half of that required at 0V voltage bias 550 because head slider 410 is already closer to disk 430 by virtue of the electrostatic attraction.

In an implementation, the DC voltage bias 460 applied to head slider 410 at which TDP reaches its maximum will equal the opposite polarity of the actual inherent contact potential between the head slider and disk interfaces, and the actual inherent contact potential may then be inferred from this measurement. This point 560 is illustrated on graph 500 as the highest point of curve 540, where in this example the DC voltage bias is approximately −0.4 volts, while the TDP is approximately 85 mw. According to the techniques described herein, the inherent contact potential between head slider 410 and disk 430 may be calculated to be +0.4 v. By then applying the determined −0.4 v to head slider 410, the inherent contact potential between head slider 410 and disk 430 will be neutralized. This neutralization may then be used as part of an approach to set and/or maintain a spacing between head slider 410 and disk 430.

Figure 6:
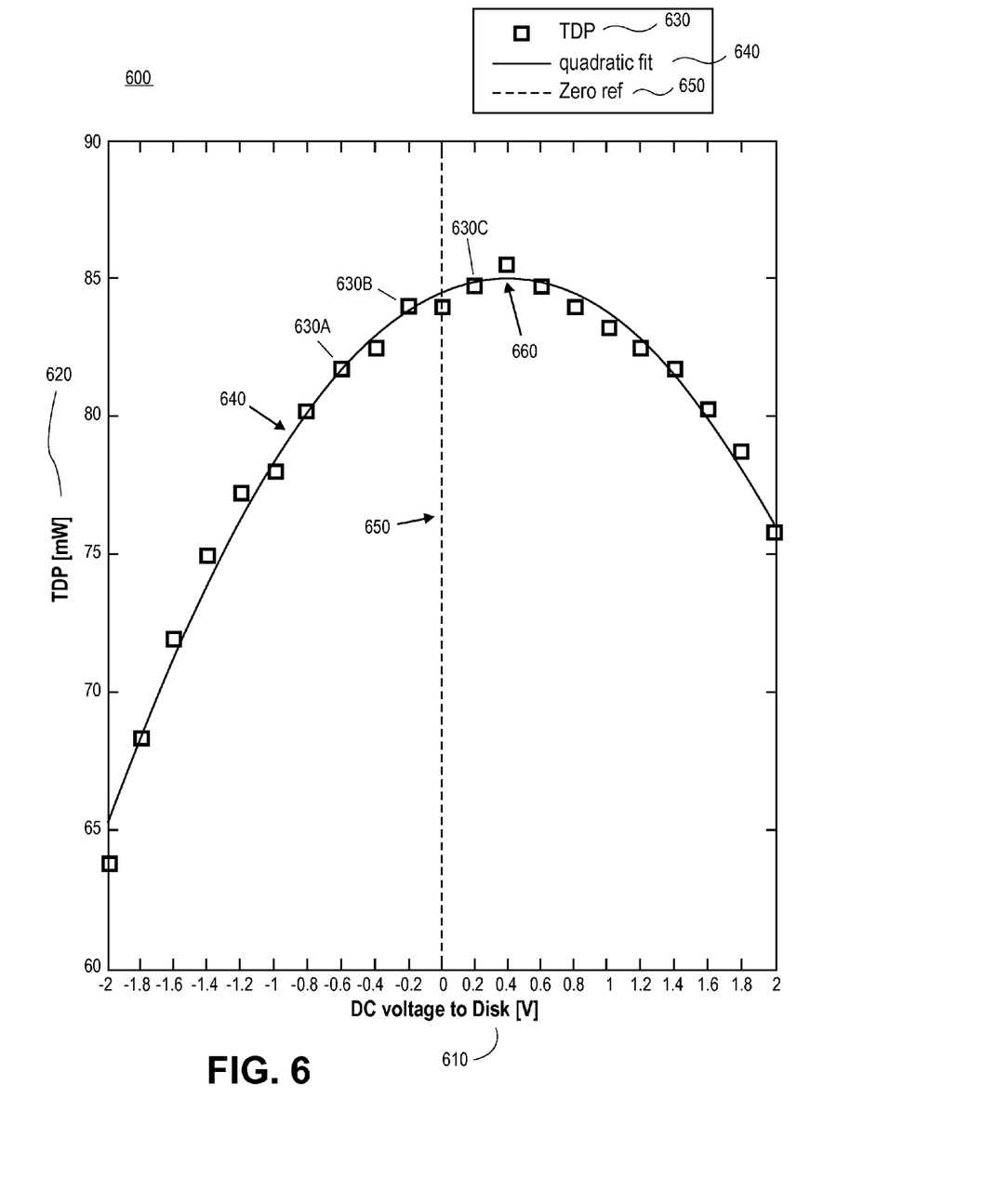
FIG. 6. is a graph illustrating an approach for determining the contact potential between a head slider and a disk where a voltage bias is applied to the disk according to an example implementation.

In another implementation, similar results may be obtained by applying the DC voltage through the disk. A graph illustrating an approach for determining the contact potential between a head slider and a disk where a voltage bias is applied to the disk according to an example implementation is provided as FIG. 6. In this example, a DC voltage bias 460 is applied to disk 430 in a "sweep" from −2 volts to +2 volts. The horizontal axis 610 of the graph 600 represents in volts the DC voltage bias 460 applied to the disk 430, in this example from −2 volts to +2 volts. While the horizontal axis 610 in FIG. 6 is divided into increments of 0.2 volts, it should be understood that this division is merely an example. According to an alternate implementation, the voltage sweep is continuous from one voltage level to another rather than pulsed at various increments.

As DC voltage bias 460 is applied to disk 430, the TDP required to actuate head slider 410 and lower the fly height until head slider 410 contacts disk 430 is measured at different discrete voltage levels within the range of the sweep. The vertical axis 620 of the graph 600 represents the TDP in milliwatts, but as discussed herein, other units of measurement are envisioned. In the example of FIG. 6, the TDP is measured at various DC voltage bias levels 610. Sample recordings of this measurement are illustrated 630*a*-630*c* on the graph 600. Each dot (refer to the legend of FIG. 6) on the graph (e.g., 630*a*-630*c*) is the TDP at that voltage bias 610. For example, at −0.6 v applied to head slider 410, the TDP is approximately 82 mw (630*a*). At −0.2 v applied to head slider 410, the TDP is approximately 84 mw (630*b*). At 0.2 v applied to head slider 410, the TDP is approximately 84 mw (630*c*), and so on.

A quadratic fit curve 640 of the TDP measurements obtained according to the currently-discussed example is illustrated on graph 600. In an implementation, the DC voltage bias 460 applied to disk 430 at which TDP reaches its maximum will be equal to the same polarity of the actual inherent contact potential between the head slider and disk interfaces. This point 660 is illustrated on graph 600 as the highest point of curve 640, where in this example the DC voltage bias is approximately 0.4 volts, while the TDP is approximately 85 mw. According to the techniques described herein, the inherent contact potential between head slider 410 and disk 430 may be calculated to be +0.4V. The applied DC voltage bias to the disk at which the TDP becomes a maximum would be +0.4V. In other words, when the DC voltage is applied through disk 430, the required DC voltage offset necessary to neutralize the inherent contact potential is equal to the contact potential in both amplitude as well as polarity. By then applying the determined +0.4 v to disk 430, the inherent contact potential between head slider 410 and disk 430 will be neutralized. This neutralization may then be used as part of an approach to set and/or maintain a spacing between head slider 410 and disk 430.

In another implementation, a DC voltage is applied through both head slider 410 and disk 430, in a similar manner as described above with regard to implementations wherein DC voltage is applied to either head slider 410 or disk 430. In the previous implementations the contact potential was neutralized either applying −0.4V to the head and 0V to the disk or by applying +0.4V to the disk and 0V to the head. In both cases, the calculation of the difference of voltage bias applied to the head subtracted by the voltage bias applied to the disk is equal to −0.4V. Mathematically, this can be stated as −0.4V (head) minus 0V (disk) which is equal to −0.4V and 0V (head) minus +0.4V (disk), which is also equal to −0.4V. Thus, a combination of head and disk voltage bias values such as −0.2V (head) and +0.2V (disk) (which results in head minus disk voltage that is =−0.2V−(+0.2V)=−0.4V) can also be used to neutralize the inherent contact potential of +0.4V. The DC offset needed to balance the inherent contact potential of +0.4V can be any combination of head and disk DC voltage values that results in a difference of head minus disk DC voltage equal to −0.4V.

In an example, a head slider 410 is intended to maintain a certain fly height, for example 8 nanometers above a disk. The TFC is actuated to discover at what TDP head slider 410 contacts disk 430 as the DC voltage sweep is being applied to head slider 410, and in various embodiments to disk 430 as well, or both. As the DC voltage bias is varied, the maximum TDP will result in the maximum clearance between head slider 410 and disk 430, according to an embodiment. The DC voltage bias at which the maximum TDP is obtained can be used to determine the contact potential between the head and disk interfaces.

In the example illustrated by the graph 500 of FIG. 5 and described above, the inherent contact potential between the head slider and disk interfaces may be inferred to be +0.4 v. By applying an offset voltage bias of −0.4 v to head slider 410 (or a voltage bias of +0.4V to the disk), the net contact potential difference is zero, which allows the fly height to be maximized (as discussed below) and offers improved reliability due to lessened wear on the head, less stripping off atoms from the head and/or disk, and a reduction in particles of lubricant collected on the head.

Turning now to a discussion of setting and/or controlling the slider-to-disk spacing (fly height) based on the determined contact potential as found by the techniques described herein. It is desirable to perform read/write operations with a particular default fly height between head slider 410 and disk 430, for example "x" mw of power delivered to the TFC, which corresponds to a measurement of a certain nanometers of fly height. The fly height value may be represented by any unit of measurement which can be converted or associated with a fly height distance. This default fly height is stored and maintained, for example, by a microcontroller communicatively coupled to a drive, although other approaches known in the art may be utilized. In an implementation, this optimal spacing is maintained by the TFC 420.

Under current approaches, at the time of HDD manufacture, the TFC 420 is actuated, contact between the head slider 410 and the disk 430 is determined, and then the head slider 410 is "pulled back" from touching the disk by a predetermined amount for read and write operation and this level is stored as the default fly height. This may be accomplished through, in various embodiments, utilizing milliwatts of power as previously discussed, or through other techniques, such as TFC heater efficiency or any other approach which can be converted to nanometers of fly height.

According to an implementation, by performing the techniques described herein, the inherent contact potential between head slider 410 interface and disk 430 may be measured and stored for use with a HDD. Further, in various embodiments, the approaches described herein may be utilized on each head-slider/disk interface in a drive, and the approaches described herein may be utilized in fully functional HDD's to measure the contact potential on each and every head slider 410-disk 430 interface and not limited to component level tests. There is no need to add any specialized hardware to a HDD and a HDD equipped with the techniques described herein may perform these measurements on the fly.

Using the graph 500 of FIG. 5 as an example: the HDD represented by FIG. 5 is manufactured and the desired read/write fly height is to be set and stored. Previous approaches would measure the TDP at zero DC voltage bias. In the illustrated example, the equivalent measurement to previous approach would be set from a resulting TDP of approximately 82 mW (which is at zero DC voltage bias). This approach would not have any effect on the inherent contact potential between the head slider and the disk. Thus, there is a risk of electrostatic attraction of the head to contact the disk intermittently during read/write operation even when there is no intended TFC actuated contact. This is because the electrostatic attraction increases when the head and the disk are in proximity on the order of 2 nm or below (which is where the read/write operations occur from).

In an implementation, by applying DC voltage bias using a sweep from −2.0 v to +2.0 v and the TDP being measured at various increments, as previously discussed. In the example illustrated by FIG. 5, it is determined that TDP is maximized at approximately 85 mw when −0.4 v is delivered to the head slider. It is then determined that the inherent contact potential between this particular head slider and disk is the opposite polarity of −0.4 v, or +0.4 v. In this approach the read/write fly height is set based on the TDP at −0.4V DC voltage bias; and −0.4 v is continuously applied to the head slider during operation of the HDD. This approach neutralizes the inherent contact potential between the head slider and the disk, thus preventing intermittent or random head to disk contacts during the lifetime operation of the HDD. Hence the technique improves the mechanical reliability of the head disk interface for long term usage of the HDD.

It should be understood that the vertical axis 520 of FIG. 5 is an indirect measurement of the spacing change. It may be represented by any unit of measure that indicates how far the head slider 410 is from the disk 430; for example, nanometers as measured magnetically with dual harmonic sensing or a Wallace equation based spacing. Further, when reference is made herein to "contact" between a head slider 410 and disk 430, this could be substituted with a relative measurement of spacing and the change between this measurement and another measurement may operate as the basis for the techniques described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive configured to determine a contact potential between a head and a disk during operation of the hard-disk drive, comprising:
   the head attached to a slider;
   the disk rotatably mounted on a spindle;
   a drive motor having a motor shaft attached to the spindle for rotating the disk;
   a voice-coil motor configured to move the head to access portions of the disk; and
   one or more electronic components configured to:
      apply a range of electric current to the slider in discrete increments;
      for each increment, measure the amount of electric current supplied to a thermal fly height control (TFC) that results in contact between the head and the disk;
      determine the increment of electric current delivered to the slider at which the amount of electric current supplied to a thermal fly height control that results in contact between the head and the disk is maximized; and,
      based on this determination, calculate the contact potential.

2. The hard-disk drive of claim 1, wherein the one or more electronic components are further configured to continuously apply an electric current to the slider equal to the opposite polarity of the contact potential.

3. The hard-disk drive of claim 1, wherein the one or more electronic components are further configured to continuously apply an electric current to the slider equal to the determined increment of electric current.

4. The hard-disk drive of claim 1, wherein the one or more electronic components are further configured to adjust the fly height of the head based on the calculated contact potential.

5. The hard-disk drive of claim 4, wherein the adjusting is performed during operation of the hard-disk drive.

6. The hard-disk drive of claim 4, wherein the adjusting further comprises:
   storing the increment of electric current; and
   applying the increment of electric current to the slider each time the TFC is actuated.

7. The hard-disk drive of claim 1, wherein the increments are at evenly-spaced intervals along the range.

8. The hard-disk drive of claim 1, wherein the electric current applied to the slider comprises a range of voltage between −2.0 v and +2.0 v.

9. The hard-disk drive of claim 8, wherein the electric current applied to the slider is DC.

10. The hard-disk drive of claim 1, wherein the one or more electronic components are configured to apply a range of electric current to the disk in discrete increments.

11. The hard-disk drive of claim 1, wherein the calculating of the contact potential is performed each time the hard disk is turned on.

12. The hard-disk drive of claim 1, wherein the range of electric current is applied to both the slider and the disk.

13. The hard-disk drive of claim 12, wherein the range of electric current is applied to both the slider and the disk simultaneously.

14. The hard-disk drive of claim 1, wherein the hard disk comprises multiple pairs of heads and disks, and wherein the one or more electronic components are further configured to calculate the contact potential for each pair of heads and disks.

15. A hard-disk drive configured to determine a contact potential between a head and a disk during operation of the hard-disk drive, comprising:
   the head attached to a slider;
   the disk rotatably mounted on a spindle;
   a drive motor having a motor shaft attached to the spindle for rotating the disk;
   a voice-coil motor configured to move the head to access portions of the disk; and
   one or more electronic components configured to:
      apply a range of electric current to the slider in discrete increments, wherein the slider is communicatively coupled to a thermal fly height control (TFC);
      actuate the TFC while applying the range of electric current;
      measure the touchdown power (TDP) at each increment of the electric current;
      identify the increment of the electric current at which the TDP is highest;
      apply the identified increment of the electric current on a continuous basis to the slider during operation of the drive.

16. The hard-disk drive of claim 15, wherein the one or more electronic components are further configured to calculate the contact potential between the slider and the disk.

17. The hard-disk drive of claim 16, wherein the contact potential between the slider and the disk is equal to the opposite polarity of the increment of the electric current at which the TDP is highest.

18. The hard-disk drive of claim 15, wherein the applying of the identified increment neutralizes the contact potential between the slider and the disk so that the contact potential between the slider and the disk is zero.

19. A method for determining contact potential, comprising:
   applying a range of electric current to a slider in a hard-disk drive in discrete increments;
   measuring, at each increment, the amount of electric current supplied to a thermal fly height control (TFC) that results in contact between a head and a disk of the hard-disk drive, wherein the slider and the head are coupled;
   determining the increment of electric current delivered to the slider at which the amount of electric current supplied to the TFC that results in contact between the head and the disk is maximized; and
   calculating a contact potential between the slider and the disk based on this determination.

20. The method of claim 19, further comprising:
   applying a continuous electric current to the slider while the hard-disk drive is operating, wherein the continuous electric current is equal to the inverse of the calculated contact potential.

* * * * *